United States Patent [19]
Evans et al.

[11] Patent Number: 5,302,978
[45] Date of Patent: Apr. 12, 1994

[54] CONTACT LENS

[75] Inventors: John M. Evans, Fremont; Ashok R. Thakrar, San Jose; Praful Doshi, Poway, all of Calif.; C. Edward Williams, Denver, Colo.

[73] Assignee: Pilkington Visioncare, Inc., Menlo Park, Calif.

[21] Appl. No.: 779,993

[22] Filed: Oct. 21, 1991

Related U.S. Application Data

[63] Continuation-in-part of Ser. No. 732,129, Jul. 18, 1991, Pat. No. 5,160,463, which is a continuation-in-part of Ser. No. 605,704, Oct. 30, 1990, abandoned.

[51] Int. Cl.$^5$ ............................................. G02C 7/04
[52] U.S. Cl. ................................. 351/162; 351/160 H
[58] Field of Search ............... 351/160 R, 160 H, 161, 351/162, 177

[56] References Cited

U.S. PATENT DOCUMENTS

| | | | |
|---|---|---|---|
| 3,536,386 | 10/1970 | Spivak | 351/162 |
| 3,679,504 | 7/1972 | Wichterle | 156/62 |
| 3,712,718 | 1/1973 | Legrand et al. | 351/162 X |
| 4,121,885 | 10/1978 | Erickson et al. | 351/177 |
| 4,447,474 | 5/1984 | Neefe | 427/164 |
| 4,558,931 | 12/1985 | Fuhrman | 351/162 X |
| 4,582,402 | 4/1986 | Knapp | 351/162 |
| 4,640,805 | 2/1987 | Neefe | 351/162 X |
| 4,704,017 | 11/1987 | Knapp | 351/177 |
| 4,719,657 | 1/1988 | Bawa | 8/453 |
| 4,889,421 | 12/1989 | Cohen | 351/162 |
| 5,034,166 | 7/1991 | Rawlings et al. | 264/1.7 |

FOREIGN PATENT DOCUMENTS

| | | |
|---|---|---|
| 0357062 | 3/1990 | European Pat. Off. |
| 0390443 | 3/1990 | European Pat. Off. |
| WO83/03480 | 10/1983 | World Int. Prop. O. |
| WO91/06886 | 5/1991 | World Int. Prop. O. |

*Primary Examiner*—Scott J. Sugarman
*Attorney, Agent, or Firm*—Howrey & Simon

[57] ABSTRACT

A contact lens of generally disc-like configuration having a central axis extending through the contact lens and about which the contact lens is substantially symmetric in configuration. The contact lens has

- a pupil zone through which the central axis extends and which comprises the area immediately circumferentially surrounding the central axis;
- an iris zone, which comprises the area circumferentially surrounding the pupil zone; and
- a peripheral zone which comprises the area circumferentially surrounding the iris zone and extends to the edge of the contact lens.

Further in the area immediately adjacent to the periphery of the iris zone and the contact lens and circumferentially extending therearound a band of dark substantially light-absorbing color is provided.

20 Claims, 3 Drawing Sheets

CONTACT LENS

CROSS-REFERENCES TO RELATED APPLICATIONS

This application is a continuation-in-part of application Ser. No. 07/732,129, filed Jul. 18, 1991, now U.S. Pat. No. 5,160,463, which is a continuation-in-part of application Ser. No. 07/605,704, filed Oct. 30, 1990, now abandoned.

BACKGROUND OF THE INVENTION

This invention relates to a contact lens, and, in particular, a contact lens which is provided with a dark masking ring.

The border area/zone between the iris and the sclera of the human eye is known as the limbal zone, and this zone is very deep in colour. In fact the colour is generally so deep as to be regarded as black.

The human eye is one of those parts of the human body which permanently shows the effects of disease and ageing, and one part thereof which readily shows this is the limbal zone. In a young healthy person the limbal zone is very deep and clear in colour, whereas the effects of illness, age and trauma can lead to a milking or clouding over of the limbal zone. This gives the person the appearance of age and relative ill-health.

SUMMARY OF THE INVENTION

The present invention is concerned with overcoming, or at least alleviating, the appearance of the milking or clouding over of the limbal zone and the effects this has.

In accordance with the present invention there is provided a contact lens of generally disc like configuration which has central axis extending through the contact lens and about which the contact lens is substantially symmetric in configuration, which contact lens has
- a pupil zone through which the central axis extends and which comprises the area immediately circumferentially surrounding the central axis;
- an iris zone which comprises the area circumferentially surrounding the pupil zone; and
- a peripheral zone which comprises the area circumferentially surrounding the iris zone and extends to the edge of the contact lens;

wherein in the area immediately adjacent to the periphery of the iris zone, and the contact lens, and circumferentially extending therearound a band of dark substantially light-absorbing colour is provided.

The band of dark substantially light-absorbing colour is normally provided in a colour which although is not necessarily harmonious to the apparent colour of the iris, whether natural or otherwise, it is of a colour which, at least, gives the appearance of black to a viewer.

In use the band of dark substantially light-absorbing colour can provide the wearer of contact lenses made in accordance with the present several useful advantages, in that the band of dark, substantially light-absorbing colour can act as any one or more of the following functions:
- a locator to enable the correct orientation of the lens to be found; or
- a means to mask out the effect of the milking/clouding over of the iris in the limbal zone.

The band of dark substantially light-absorbing colour is preferably provided at a distance from the central axis of the contact lens so that it will overlie, and therefore mask the natural limbal zone of the eye.

The provision of the band of dark substantially light-absorbing colour in accordance with the present invention masks the natural limbal zone of the human eye, with a band of dark and clearly distinct colour. In this way the wearer of the contact lens or contact lenses made in accordance with the present invention is provided with eyes which to the observer look young and healthy.

Preferably, the contact lens provided with the band of dark substantially light-absorbing colour, is a soft contact lens.

Alternatively, the contact lens provided with the band of dark substantially light-absorbing colour is a composite type contact lens. That is to say a contact lens which has the pupil zone formed from a hard material, such as a rigid gas permeable material, and the iris zone is a skirt formed around the pupil zone from a hydrogel material which has a negligible expansion coefficient upon hydrolisation with the peripheral zone being formed as an integral part of this surrounding the iris zone.

The present invention may be used in respect of a large variety of general design types of contact lenses from single focal length designs to multifocal length contact lenses. The main criteria applied to the suitability of a particular design type of contact lens for use with the present invention, is whether the band of dark substantially light-absorbing colour can be correctly positioned on the lens so that it masks the limbal zone of the wearer's eye whilst in use without affecting the visual usage of the lens through the focussing section.

The band of dark substantially light-absorbing colour can be applied or incorporated into a contact lens made in accordance with the present invention in a number of differing ways.

In a first arrangement the band of dark substantially light-absorbing colour comprises a solid band of colour.

In a second arrangement the band of dark substantially light-absorbing colour comprises a series of thin bands of dark substantially light-absorbing colour which are closely spaced to one another in order to give the impression that they are one band to a viewer. Further, the individual thin bands may be of differing colours or shades of the same colour.

In a third arrangement the band of dark substantially light-absorbing colour comprises a series of islands of colour which interact with one another to give the impression to the viewer that they are a band.

The actual selection of the colour and colouring material used in the present invention is of significant importance to the effective operation of the present invention.

The band of dark substantially light-absorbing colour can be applied to or incorporated into the contact lens made in accordance with the present invention in a number of differing ways.

In a first arrangement of the present invention the band of dark substantially light-absorbing colour is applied to a finished contact lens. In order to achieve this the finished lens is tinted, in any one of the plethora of known tinting processes employed in the industry.

In this case the band of dark substantially light-absorbing colours is formed of materials such as FIGS. 5A and 5B show a fifth example of a contact lens made in accordance with the present invention. FIGS. 5A and 5B are hereinafter referred to collectively as FIG. 5.

FIGS. 6A and 6B show a sixth example of a contact lens made in accordance with the present invention. FIGS. 6A and 6B are hereinafter referred to collectively as FIG. 6.

Suitable soluble vat dyes include:

| Colour Index | Chemical Name |
| --- | --- |
| Vat Orange 5 | 6,6'-diethoxy-22' (3H.3'H) bi benzo (b) thiopene 3-3' dione |
| Vat Orange 1 | Dibromo di benzo (b, def) chrysene —7, 14-dione |
| Vat Brown 1 | 16,23-dihydrodinaphthol (2,3-a:2"3"-i) naphth (2',3':6,7) indolo (2,3-c) |
| Vat Yellow 3 | N,N'-(9,10)-dihydro-9,10-dioxo,1,5 -anthracenediyl) bisbenzamide |
| Vat Blue 6 | 7,16-dichloro-6,15-di hydro-s'9,14,18- anthrazinetetrone |
| Vat Green 1 | 16,17,-dimethoxydinaphtho (1,2,3,cd:31,2',1"-1m) perylene-5, 10-dione |

The soluble vat dyes as used in this method are normally applied to the lens in their leuco solubilised form.

Clearly the above mentioned vat dyes can be mixed with one another to produce the desired dark substantially light-absorbing colour.

With regard to the reactive dyes there is one precondition placed on their usage and that is that the main body of the contact lens is formed from a monomer which contains Hydroxy group (OH) or other reactive groups, for example, HEMA (Hydroxy Ethyl MethAcrylate). Suitable reactive dye types include:

| Colour Index | Chemical Name |
| --- | --- |
| Reactive Black #5 | 1,2,7 naphthalene disulfonic acid 4 amino 5 hydroxy-3, 6 bis ((4-((2-sulfonicoxy)ethyl)sulphonyl) phenyl)azol) |
| Reactive Blue #4 | [2-anthracene-sulfonic acid, 1-amino-4, 3-((4,6,dichloro-s-triazin-2-yl)amino)-4-sulfoanilino)-9,10 -dihydro-9,10-dioxo,disodium salt} |
| Reactive Blue #19 | [2-anthracene-sulfonic acid, amino-9,10 dihydro, 9,10-dioxo-4-((3-((2-Sulfooxy)ethyl)sulfonyl) phenyl)amino)-disodium salt) |
| Reactive Blue #21 | Copper (29H,31H phthalcyaninate(2) $N^{28},N^{30},N^{34}$ sulfo ((4-((2-sulfooxy)ethyl)sulphonyl)phenyl) amino sulphony derive |
| Reactive Blue #163 | [triphenodixoanzinedisulfic acid, 6,13-dichloric-3,10 bis ((4-((4-6-dichloro-1,2,5-triazin 2-yl)amino) sulfophenyl)amino-tetrasodium salt] |
| Reactive Orange #78 | [2-napthalene sulphonic acid 7-(acetylamino)-4-hydroxy-3((4((2 (sulfooxy)ethyl)sulfonyl)phenyl) azol] |
| Reactive Red #11 | (5-((4,6-dichloro-1,3,5-triazin-2-yl) amino-4-hydroxy-3-((t-sulfo-2-naphthalen yl)azo)-2,7-naphthalene-disulphonic acid trisodium salt |
| Reactive Red #180 | (5-(benzoylamino)-4-hydroxy-3-((1-sulfo-6-((2-sulfooxy)ethyl) sulfonyl)-2-naphthalene)azo)-2,7-naphthalenedisulfonic acid, tetrasodium salt. |
| Reactive Yellow #15 | [benzensulfonic acid, 4-(4,6-dihydro-4-((2 methoxy-5-methyl-4-((2-sulfooxy)ethyl) sulfonyl)phenyl)azo)-3-methyl-5- oxo 1H pyrazol-1-yl))] |
| Reactive Yellow #86 | [2,3,-benzenedisulfonic acid, 4-((5-amino carbonyl-1-ethyl-1, 6-dihydro-2-hydroxy-4-methyl-6-oxo |

| Colour Index | Chemical Name |
| --- | --- |
| | 3-pyridinyl)azo)-6-(4,6-dichloro-1,3,5-t riazin-2-yl)amino)disodium salt] |

Further, it should also be noted that dyes used in other operations, such as marking of contact lenses may be used, for example 2-[(2,5 diethoxy-4](4-methylphenyl)thio]Phenyl]Azo-1,3,5-Benzenetriol.

Clearly the above mentioned dyes can, and in most cases would, be mixed with one another to produce the desired dark substantially light-absorbing colour.

Further, with regard to the inorganic salts/dyes which may be precipitated in situ, the organic salts include the soluble vat dyes mentioned earlier, and the organic salt/dyes include the halide sulphide, and nitrate salts of Group II elements and the transition elements, for example Silver Nitrate, Barium Chloride and Barium Sulphide.

Clearly as with the above cases the precipitated salts can be mixed with one another to produce the desired dark substantially light-absorbing colour.

In an alternative way of applying the band of dark substantially light-absorbing colour to the surface of a contact lens, the band of dark substantially light-absorbing colour is printed onto the surface of the contact lens. At present there are a number of methods for printing material onto the surface of a contact lens and any one of these known methods may be employed to produce a contact lens made in accordance with the present invention.

Preferably, with this form of applying the band of dark substantially light-absorbing colour to the surface of a contact lens the band is printed onto the external (or convex) surface of the contact lens.

In a third way of impairing the band of dark substantially light-absorbing colour to the contact lens the band comprises a pigment suspended in a solvent material which is applied to the surface of a contact lens mould, and the contact lens is cast and polymerised thereabouts. This means that the band of dark substantially light-absorbing colour is incorporated into the body of the lens as part of the contact lens surface or into the lens body in the region immediately adjacent to the lens surface.

Suitable pigments for use with this method include:

| Colour Index | Chemical Name |
| --- | --- |
| Pigment Black 7 | Carbon Black |
| Pigment Black 11 | Iron Oxide |
| Pigment Brown 6 | Iron Oxide |
| Pigment Red 101 | Iron Oxide |
| Pigment Yellow 42 | Iron Oxide |
| Pigment White #6 | Titanium Oxide |
| Pigment Green #17 | Chromic Oxide |
| Pigment Blue #36 | Chromium-aluminum-cobaltous Oxide |
| Pigment Green #7 | Poly chloro copper phthalocyanine |
| Pigment Blue #15 | Copper phthaloxyanine |
| Pigment Violet #23 | 3,amino-9-ethyl carbazole-chloranil |

Clearly the above mentioned pigments may be mixed with one another to produce the desired dark substantially light absorbing colour.

Further, precipitated vat dyes, including precipitated versions of those disclosed earlier may be used as suitable pigments in the above method.

The detail of this particular arrangement for incorporating the band of dark substantially light-absorbing colour into the contact lens is described in detail in co-pending U.S. application Ser. No. 469007, now abandoned, which is incorporated herein by way of reference.

In a second particular arrangement for incorporating the band of dark substantially light-absorbing colour into the body of the lens, and a fourth means of imparting the band of dark light-absorbing colour to the contact lens, pigment is dispersed in a polymerisable medium which is then applied to the surface of a contact lens casting mould and the contact lens is cast and polymerised thereabouts. In this particular instance as the main body of the lens is polymerised so is the polymerisable medium in which pigment is dispersed. As a consequence of this the pigment is incorporated into the contact lens as part of the surface of the contact lens or immediately adjacent thereto.

The pigments which may be used with this particular arrangement of the present invention include those disclosed above for use with the earlier disclosed methods, which may be dispersed in the same monomeric materials as that from which the contact lens is formed.

In a fifth basic form of imparting the band of dark substantially light-absorbing colour to the contact lens, a rod of polymeric material is formed, which rod has a band of dark substantially light-absorbing colour throughout its length, this rod is then cut into buttons from which the contact lenses are then machined.

In its simplest form this basic form of imparting the band of dark substantially light absorbing colour to the contact lens by the above method may be used to produce individual buttons and not a rod.

In a sixth basic form of imparting the band of dark substantially light absorbing colour to the contact lens, a three layer sandwich layered button may be formed wherein a dark coloured central layer is sandwiched between two clear layers. The thickness of the dark substantially light-absorbing coloured layer would be between 0.05 mm and 1 mm.

This method of producing the band of the dark substantially light-absorbing colour to the contact lens lends itself to a form of lens manufacture wherein the base curve of the lens is formed against the curved surface of the button mould.

The construction of the band of dark substantially light-absorbing colour may be either:
- solid, i.e. a solid band of colour: or
- an intermittent pattern, made up of islands of colour; or
- an intermittent pattern, made up of islands of colour which diffuse together to form a substantially solid band of colour which has different depths of colour.

The band of dark substantially light-absorbing colour is preferably provided at a radius of between 5.9 mm and 6.75 mm from the central axis of the contact lens.

The radius is a measurement for the centre of a particular band, and not a definition of the outside and inside limits for a band in accordance with the present invention.

The band of dark substantially light-absorbing colour preferably has a width of between 0.15 mm and 2.0 mm, and, most preferably between 0.3 mm and 1.0 mm.

BRIEF DESCRIPTION OF THE DRAWINGS

The invention will now be illustrated by way of examples of contact lenses made in accordance with the present invention, and as shown in the accompanying drawings, in which.

DESCRIPTION OF THE PREFERRED EMBODIMENTS

FIGS. 1 to 6 of the accompanying drawings show six plan views of contact lens made in accordance with the present invention, whilst FIGS. 7 to 11 of the accompanying drawings show five alternative through cross-sections for contact lenses made in accordance with the present invention.

As a general point all of the Figures of the accompanying drawings show contact lenses which are of generally circular disc like configuration. The contact lenses have a convex surface 2 which when the lens is fitted in the human eye is outwardly facing and a concave surface 3 which when the lens is fitted in the human eye is inwardly facing and in contact with the cornea of the human eye.

A band 4 of dark light-absorbing colour is provided towards the periphery of the contact lens 1.

Figure 1:
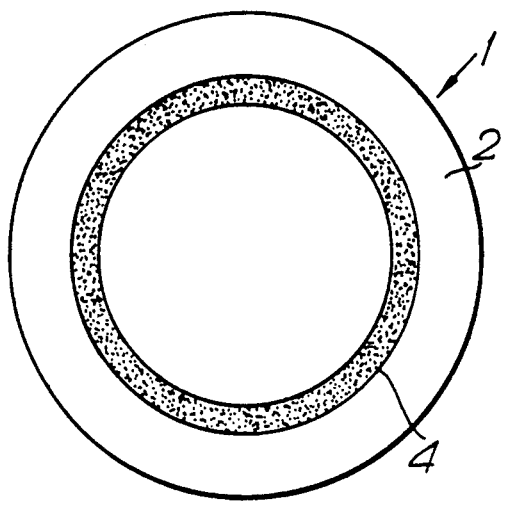
FIG. 1 shows a first example of a contact lens made in accordance with the present invention.

Now referring specifically to FIG. 1 of the accompanying drawings there is shown a first example of a configuration of a contact lens 1 made in accordance with the present invention.

In this example the contact lens 1 is a soft contact lens manufactured from a hydrogel material such as HEMA (Hydroxy Ethyl MethAcrylate). In this particular example the band 4 of dark light-absorbing colour is a solid band of colour formed of the appropriate width and at the appropriate radius from the centre of the contact lens 1.

Now the actual method used to impart the band 4 of dark light-absorbing colour to the contact lens to a degree will dictate the actual structure of the contact lens 1.

Figure 7:
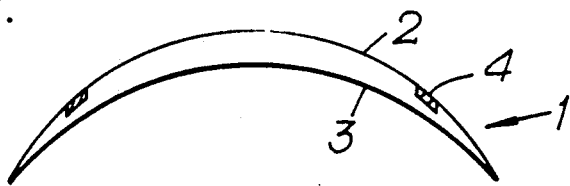
FIG. 7 shows a cross section through a contact lens made in accordance with the present invention.
Figure 8:
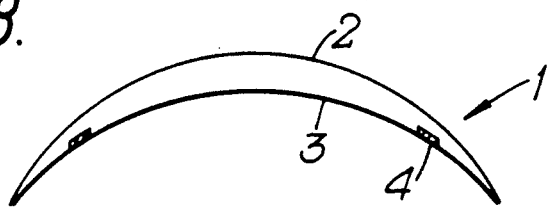
FIG. 8 shows a second cross section through a contact lens made in accordance with the present invention.

If the band 4 of dark light-absorbing colour was imparted to the contact lens 1 by either
  tinting of a finished lens; or applying tinting material to a mould surface and casting, and polymerising, the contact lens thereabouts; or applying a pigment dispersed in a polymerisable material to a mould surface and casting, and polymerising the contact lens thereabouts;

the contact lens so formed will have a cross section similar to that shown in FIG. 7 or FIG. 8 of the accompanying drawings dependent upon which surface of the mould/contact lens is worked on.

Figure 9:
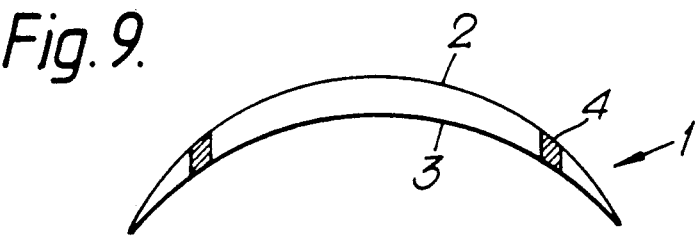
FIG. 9 shows a third cross section through a contact lens made in accordance with the present invention.

However, if the band 4 of dark light-absorbing colour was imparted to the contact lens 1 by forming a rod or a baton of material having a band of colour throughout which corresponds to the band 4 of dark light-absorbing colour in the contact lens, the contact lens will have a cross section similar to that shown in FIG. 9 of the accompanying drawings.

Figure 10:
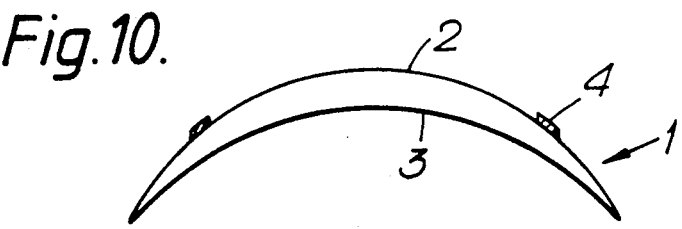
FIG. 10 shows a fourth cross section through a lens made in accordance with the present invention.

Further, if the band 4 of dark light-absorbing colour was imparted to the contact lens 1 by printing upon the surface of the finished contact lens, the contact lens will have a cross section similar to that shown in FIG. 10.

Figure 11:
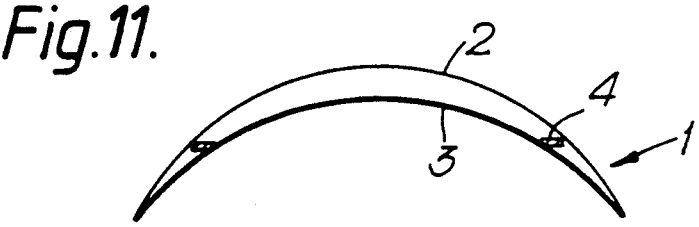
FIG. 11 shows a fifth cross section through a lens made in accordance with the present invention.

Finally, if the band of dark substantially light-absorbing colour was imparted to the contact lens 1 by forming a sandwich layered button having a filling layer which corresponds to the band of light-absorbing colour in the contact lens, the contact lens will have a cross-section similar to that shown in FIG. 11.

Figure 2:
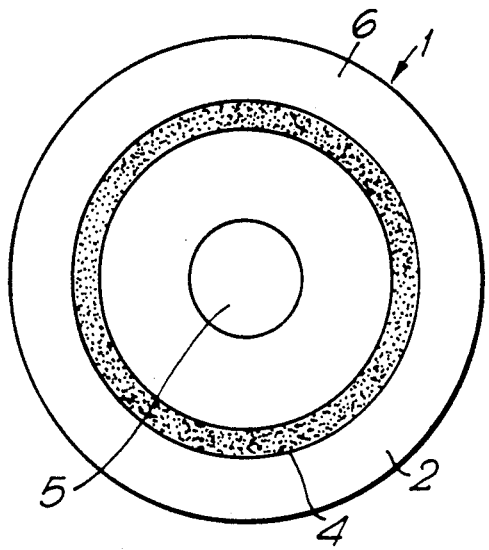
FIG. 2 shows a second example of a contact lens made in accordance with the present invention.

Now referring specifically to FIG. 2 of the accompanying drawings there is shown a second example of a configuration of a contact lens 1 made in accordance with the present invention.

In this example the contact lens 1 is a composite contact lens having a central pupil section 5 which is formed from a Rigid Gas Permeable material and an iris section 6 which circumferentially surrounds the pupil section 5.

In this particular example, the band 4 of dark light-absorbing colour is a solid band of colour formed of the appropriate width and at the appropriate radius from the centre of the contact lens 1.

The actual construction of the contact lens 1 in this case places certain restrictions on how the band 4 of dark light-absorbing colour can be imparted to the contact lens 1 which will be readily understood by those in the industry.

If the band 4 of dark light-absorbing colour was imparted to the contact lens 1 by tinting of the finished contact lens 1 the contact lens will have a cross section similar to that shown in either FIG. 7 or FIG. 8 of the accompanying drawings.

However, if the band 4 of dark light-absorbing colour was imparted to the contact lens by forming a rod of material having a core of Rigid gas permeable material and an outer layer of xerogel (unhydrated hydrogel) material with a band of colour throughout the outer layer which corresponds to the band 4 of dark light-absorbing colour in the contact lens 1, the contact lens 1 will have a cross section similar to that shown in FIG. 9 of the accompanying drawings.

Further, if the band 4 of dark light-absorbing colour was imparted to the contact lens by printing upon the surface of the finished contact lens 1, the contact lens 1 will have a cross-section similar to that shown in FIG. 10 of the accompanying drawings.

Finally, if the band of dark substantially light-absorbing colour was imparted to the contact lens 1 by forming a sandwich layered button having a filling layer which corresponds to the band of light-absorbing colour in the contact lens, the contact lens will have a cross-section similar to that shown in FIG. 11.

Figure 3:
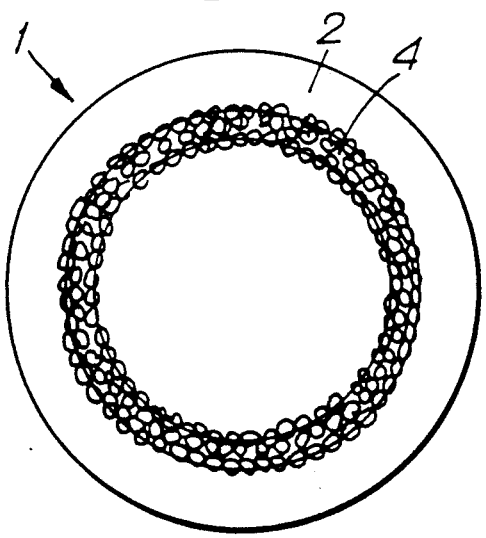
FIG. 3 shows a third example of a contact lens made in accordance with the present invention.

Now referring specifically to FIG. 3 of the accompanying drawings there is shown a third example of a configuration of a contact lens 1 made in accordance with the present invention.

In this example the contact lens 1 is a soft contact lens 1 manufactured from a hydrogel material, such as HEMA (Hydroxy Ethyl MethAcrylate). In this particular example the band 4 of dark substantially light-absorbing colour is formed from an intermittent pattern which interacts with the human eye to produced the desired effect. The pattern imparted to the contact lens is coherent and is held within an area that forms a band of the required width and within the bounds of the requirement for the radius.

If the band 4 of dark substantially light-absorbing colour was imparted to the contact lens by either;

applying tinting material to a mould surface, and casting and polymerizing the contact lens thereabouts; or applying a pigment dispersed in a polymerisable material to a mould surface, and casting and polymerizing the contact lens thereabouts;

the contact lens so formed will have a cross section similar to that shown in FIG. 7 or FIG. 8 of the accompanying drawings.

However, if the band 4 of dark light-absorbing colour was imparted to the contact lens by printing upon the surface of the finished contact lens 1, the contact lens 1 will have a cross section similar to that shown in FIG. 10 of the accompanying drawings.

Figure 4:
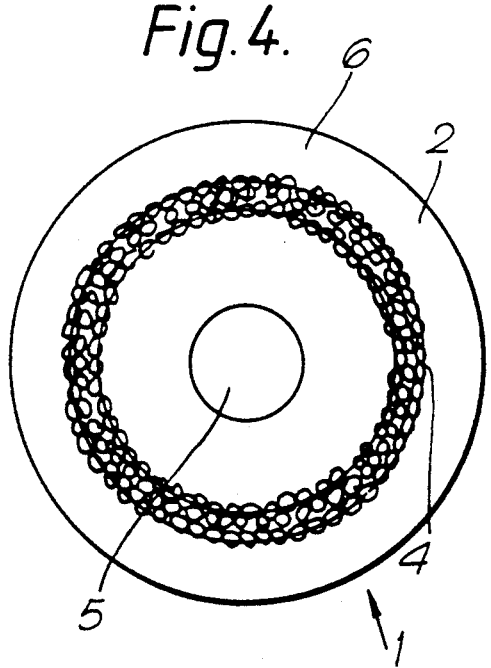
FIG. 4 shows a fourth example of a contact lens made in accordance with the present invention.

Now referring specifically to FIG. 4 of the accompanying drawings, there is shown a fourth example of a configuration of a contact lens 1 made in accordance with the present invention.

In this example the contact lens 1 is a composite contact lens having a central pupil section 5 which is formed from a Rigid Gas Permeable material and an iris section 6 which circumferentially surrounds the pupil section 5.

In this particular example, the band 4 of dark light-absorbing colour is formed from an intermittent pattern which interacts with the human eye to produce the desired effect. The pattern imparted to the contact lens 1 is coherent and is held within the area that forms a band of the required width and within the bounds of the requirement for the radius.

As with the example described with reference to FIG. 2 of the accompanying drawings the actual construction of the contact lens 1 in this case places certain restrictions on how the band 4 of dark light-absorbing colour can be imparted to the contact lens 1.

If the band 4 of dark light-absorbing colour was imparted to the contact lens 1 by tinting of the finished contact lens 1, the contact lens 1 will have a cross section similar to that shown in FIG. 7 or FIG. 8 of the accompanying drawings.

However, if the band 4 of dark light-absorbing colour was imparted to the contact lens 1 by printing upon the surface of the contact lens 1, the contact lens 1 will have a cross section similar to that shown in FIG. 10 of the accompanying drawings.

It will be well appreciated that the intermittent pattern broadly disclosed with reference to FIGS. 3 and 4 of the accompanying drawings could be either an intermittent pattern that is set upon the contact lens by the imparting of the pattern to the moulding surface or the surface of the finished contact lens 1, i.e. the pattern is fixed. or an intermittent pattern in which the colour used in the pattern differs from the applied area, giving areas of diffuse colour as well as the well defined colour areas applied.

Figure 5:
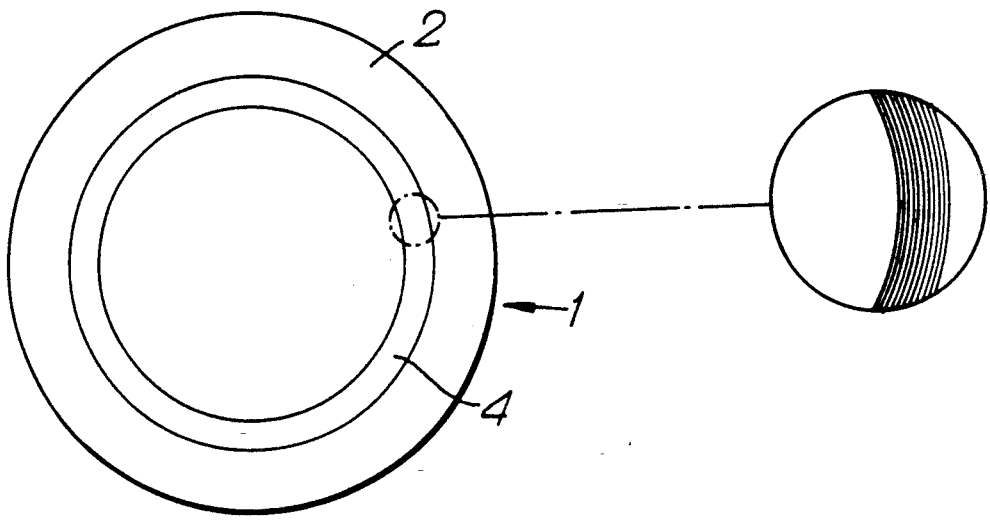
FIG. 5 shows a fifth example of a contact lens made in accordance with the present invention.
Figure 6:
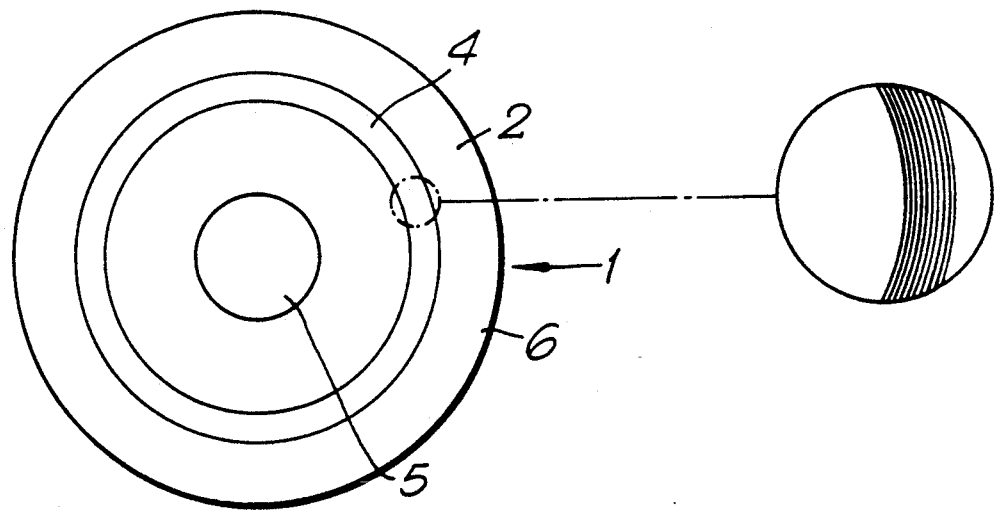
FIG. 6 shows a sixth example of a contact lens made in accordance with the present invention.

Now referring specifically to FIG. 5 of the accompanying drawings there is shown a fifth example of a configuration of a contact lens 1 made in accordance with the present invention.

In this particular example the contact lens 1 is a soft contact lens 1 manufactured from a hydrogel material, such as HEMA (Hydroxy Ethyl MethAcrylate). In this example the band 4 of dark substantially light-absorbing colour is formed from a series of concentric circles or rings. In effect the individual circles or rings are thin bands of dark substantially light-absorbing colour. These bands (circles or rings) are closely spaced so that to a viewer they appear to be a single band of colour.

If the band 4 of dark light-absorbing colour was imparted to the contact lens by either:

tinting of a finished lens; or applying tinting material to a mould surface and casting and polymerizing the contact lens thereabouts; or applying a pigment dispersed in a polymerizable material to a mould surface, and casting and polymerizing the contact lens thereabouts;

the contact lens so formed will have a cross section similar to that shown in FIG. 7 or 8 of the accompanying drawings dependent upon which surface of the mould/contact lens is worked upon.

However, if the band 4 of the dark light-absorbing colour was imparted to the contact lens by forming a rod or baton of material having a series of thin bands of colour throughout that corresponds to the band 4 of dark light-absorbing colour in the contact lens, the contact lens will have a cross section similar to that shown in FIG. 9 of the accompanying drawings.

Further, if the band 4 of the dark light-absorbing colour was imparted to the contact lens 1 by printing upon the surface (convex surface) of the contact lens the contact lens will have a cross section similar to that shown in FIG. 10 of the accompanying drawings.

Particular examples of contact lens made in accordance with the present invention will now be given.

EXAMPLE 1

A contact lens as described in accordance with FIG. 1 of the accompanying drawings was manufactured, with the band 4 of dark light-absorbing colour being imparted by mounting the finished hydrated lens on a suitable fixture and masking with a form leaving an open ring shape. An aqueous solution of a mixture of solubilised Vat dyes comprising 4 parts Vat Blue #6 and 4 parts Vat Brown #1 per 100 parts water, is allowed to permeate into the open face of the lens. After the dye solution has diffused into the lens, the lens is then placed into a solution of sodium nitrite in dilute sulphuric acid whereupon the dye will precipitate out into the lens. The lens, now containing a permanent dark coloured ring, is rinsed and placed into saline for further use.

EXAMPLE 2

A contact lens as described in FIG. 1 containing band of dark substantially light-absorbing colour was prepared by mounting a hydroxyethyl methacrylate HEMA, lens onto a fixture and covering with a mask leaving an open ring shape. An aqueous solution of a Reactive dye containing 10 parts of Reactive Black #5 per 100 parts water, is allowed to permeate into the contact lens. The contact lens is then removed from the fixture, rinsed and placed into a solution of sodium carbonate. The dye thereupon reacts with the HEMA polymer to form a permanent black ring. The lens is rinsed and placed into saline for further use.

EXAMPLE 3

A contact lens as described in FIG. 1 containing a band of dark substantially light-absorbing colour is prepared by applying a monomer mix to the lens and reacting it thereto. Hence a HEMA solution containing 25 parts per 100 of Pigment Black 7 and 0.5 parts of tert butyl peroctoate as a thermal initiator, is applied to a HEMA lens surface by using a pad transfer printing method in the form of a ring shape. The lens is then heated to react the ring to the surface of the lens. The lens is then hydrated in saline to give a lens containing a dark ring.

EXAMPLE 4

A contact lens as described in FIG. 1 containing a band of a dark substantially light-absorbing colour is prepared by a process of applying a coloured band to the surface of a mould. Thus a suspension is formed of 20 parts Pigment Blue #36, 4.5 parts Pigment Red #101. 4.5 parts of Pigment Yellow #42, 1.0 part fumed silica and 20 parts of polymethylmethacrylate in 35 parts 1-methoxy-2-propyl acetate and 35 parts cyclohexane by dispersing under high speed mixing. A ring shaped pattern is then printed onto a mould surface using a pad transfer printing method. The mould is used to cast mould lenses of a mixture of hydroxyethyl methacrylate containing ethylene glycol dimethacrylate, and benzoin methyl ether as a photoinitiator. The lenses are cured under UV irradiation. Upon demoulding a lens with a dark ring is recovered. The lens is finished through the hydration and extraction procedures known to the industry.

EXAMPLE 5

A contact lens as described in FIG. 1 containing band of dark substantially light-absorbing colour is prepared by a cast moulding process. Thus a dispersion of a mixture of 20 parts Pigment Blue #36, 4.5 parts Pigment Red #101 and 4.5 parts Pigment Yellow #42 is made in 70 parts of hydroxyethyl methacrylate. 0.2 parts of USP 245 is added as initiator. A polypropylene lens mould is corona treated for 1 second and a ring pattern is printed onto the mould with the HEMA suspension using a pad transfer printing method. This mould is used to cast a lens from a mixture of HEMA containing 0.5% ethylene glycol methacrylate and 0.2% USP 245 as initiator. The lens is cured by heating at 65° C. for 12 hours. After demoulding a lens is produced that contains a dark ring. The lens is finished by the usual methods known to the industry.

EXAMPLE 6

A contact lens as described in FIG. 1 containing a band of dark substantially light-absorbing colour is prepared from a button containing a dark ring running throughout its length. Thus a clear poly hydroxyethyl methacrylate button is prepared by cast moulding. This button is then provided with a circular space throughout its length using a trephanning bit. The open space is then filled with a suspension of HEMA containing 20 parts of Pigment Black 7 per 100 and 0.2 parts of USP 245 as initiator. The button is then heated to cause the whole button to become a complete entity. A contact lens is machined from this button using the method known to the industry and then hydrated in saline. The resulting lens has a dark ring within the lens.

EXAMPLE 7

A contact lens as described in FIG. 1 containing a band of dark substantially light-absorbing colour is prepared from a layered sandwich button. Thus a layer of HEMA containing benzoin methyl ether as initiator is polymerised under UV irradiation. A second layer of HEMA containing 20 parts of Pigment Black 7 and 0.2 parts of USP 245 as initiator per 100 parts HEMA, is poured over the first layer and cured slightly with heat. A third layer of HEMA containing 0.2 parts of USP 245 per 100 parts HEMA is then poured over the second layer. The whole button is then cured by heating. From this sandwich button a lens is prepared that contains a dark ring using methods known in the industry.

EXAMPLE 8

A composite contact lens made in accordance with FIG. 2 of the accompanying drawings is manufactured as follows.

The composite contact lens is formed by one of the known processes in the industry. The finished lens, with its skirt in a hydrated state is then mounted in a suitable fixture and marked to leave an open ring. An aqueous solution of a mixture of solubilised Vat dyes comprising 4 parts VAT Blue #6 and 4 parts VAT Brown #1 per 100 parts water, is allowed to permeate into the open face of the lens. After the dye solution has diffused into the lens, the lens is then placed into a solution of sodium nitrite in dilute sulphuric acid whereupon the dye will precipitate out into the lens. The lens, now containing a permanent dark coloured ring, is rinsed and placed into saline for further use.

EXAMPLE 9

A contact lens made in accordance with FIG. 3 of the drawings is prepared by a cast moulding process. Thus a dispersion of a mixture of 20 parts Pigment Blue #36, 4.5 parts Pigment Red #101 and 4.5 parts Pigment Yellow #42 is made in 70 parts of hydroxyethyl methacrylate. 0.2 parts of USP 245 is added as initiator. A polypropylene lens mould is corona treated for 1 second and a ring pattern comprising interacting islands of colour is printed onto the mould with the HEMA suspension using a pad transfer printing method. This mould is used to cast a lens from a mixture of HEMA containing 0.5% ethylene glycol methacrylate and 0.2% USP 245 as initiator. The lens is cured by heating at 65° C. for 12 hours. After demoulding a lens is produced that contains a dark ring. The lens is finished by the usual methods known to the industry.

EXAMPLE 10

A composite contact lens made in accordance with FIG. 4 of the accompanying drawings is manufactured as follows:

The composite contact lens is formed by one of the known processes in the industry. The finished lens, with its skirt in a hydrated state is then mounted in a suitable fixture and masked. The mask used giving a ring pattern comprising a series of openings through which the lens can be tinted. An aqueous solution of a mixture of solubilised Vat dyes comprising 4 parts Vat Blue #4 and 4 parts Vat Brown #1 per 100 parts water, is allowed to permeate into the open face of the lens. After the dye solution has diffused into the lens, the lens is then placed into a solution of sodium nitrite in dilute sulphuric acid whereupon the dye will precipitate out into the lens. The lens, now containing a permanent dark coloured ring, is rinsed and placed into saline for further use.

EXAMPLE 11

A contact lens made in accordance with FIG. 5 of the accompanying drawings is prepared by a cast moulding process. Thus a dispersion of a mixture of 20 parts Pigment Blue #36, 4.5 parts Pigment Red #101 and 4.5 parts Pigment Yellow #42 is made in 70 parts of hydroxyethyl methacrylate. 0.2 parts of USP 245 is added as initiator. A polypropylene lens is corona treated for 1 second and a ring pattern comprising a series of concentric circles/rings is printed onto the mould with the HEMA suspension using a pad transfer printing method. This mould is used to cast a lens from a mixture of HEMA containing 0.5% ethylene glycol methacrylate and 0.2% USP 245 as initiator. The lens is cured by heating at 65° C. for 12 hours. After demoulding a lens is produced that contains a dark ring. The lens is finished by the usual methods known to the industry.

EXAMPLE 12

A composite contact lens made in accordance with FIG. 4 of the accompanying drawings is manufactured as follows.

The composite contact lens is formed by one of the known processes in the industry. The finished lens with its skirt in a hydrated state is then mounted in a suitable fixture and masked. The mark used giving a ring pattern comprising a series of concentric circular circle/ring openings through which the lens can be tinted. An aqueous solution of a mixture of solubilised Vat dyes comprising 4 parts Vat Blue #6 and 4 parts Vat Brown #1 per 100 parts water, is allowed to permeate into the open face of the lens. After the dye solution has diffused into the lens, the lens is then placed into a solution of sodium nitrite in dilute sulphuric acid whereupon the dye will precipitate out into the lens. The lens, now containing a permanent dark colouring ring, is rinsed and placed into saline for further use.

What we claim is:

1. A contact lens of generally disc-like configuration which has a central axis extending through the contact lens and about which the contact lens is substantially symmetric in configuration, which contact lens has
   a pupil zone through which the central axis extends and which comprises the area immediately circumferentially surrounding the central axis;
   an iris zone, which comprises the area circumferentially surrounding the pupil zone; and
   a peripheral zone which comprises the area circumferentially surrounding the iris zone and extends to the edge of the contact lens;
   wherein in the area immediately adjacent to the periphery of the iris zone and the peripheral zone of the contact lens there is a circumferentially extending band of dark substantially light-absorbing colour.

2. A contact lens as claimed in claim 1, wherein the band of dark substantially light-absorbing colour is provided at a distance from the central axis of the contact lens so that it will overlie, and therefore mask the natural limbal zone of the eye.

3. A contact lens as claimed in claim 1, wherein the contact lens provided with the band of dark substantially light-absorbing colour is a soft contact lens.

4. A contact lens as claimed in claim 1, wherein the contact lens provided with the band of dark substantially light-absorbing colour is a composite contact lens.

5. A contact lens as claimed in claim 1, wherein the band of substantially light-absorbing colour comprises a solid band of colour.

6. A contact lens as claimed in claim 1, wherein the band of substantially light-absorbing colour comprises a series of thin bands of substantially light-absorbing colour which are closely spaced to one another in order to give the impression that they are one band of colour to the viewer.

7. A contact lens as claimed in claim 1, wherein the band of substantially light-absorbing colour comprises a series of islands of colour which interact with one another to give the impression to the viewer that they are a band.

8. A contact lens as claimed in claim 1, wherein the band of dark substantially light-absorbing colour is applied by tinting the finished contact lens.

9. A contact lens as claimed in claim 3, wherein the dark, substantially light-absorbing colour comprises a pigment suspended in a solvent which is applied to the surface of a contact lens mould, with the contact lens cast and polymerized thereabouts.

10. A contact lens as claimed in claim 3, wherein the dark substantially light-absorbing colour comprises a precipitate vat dye which is applied to the surface of a contact lens mould, and the contact lens cast and polymerised thereabouts.

11. A contact lens as claimed in claim 2, wherein the band of dark substantially light-absorbing colour is printed onto the surface of the contact lens.

12. A contact lens as claimed in claim 8, wherein the band of dark substantially light-absorbing colour applied to the surface of a contact lens comprises a band which is printed onto the external or convex surface of the contact lens.

13. A contact lens as claimed in claim 3, wherein the band of dark substantially light-absorbing colour is incorporated into the body of the lens by pigment being dispersed in a polymerisable medium which is then applied to the surface of a contact lens casting mould and the contact lens is cast and polymerised thereabouts.

14. A contact lens as claimed in claim 1, wherein the band of dark substantially light-absorbing colour is incorporated into the contact lens using a rod of polymeric material, which rod has a band of dark substantially light-absorbing colour throughout its length, and this rod is cut into buttons from which the contact lenses are then machined.

15. A contact lens as claimed in claim 14, wherein the rod formed is an individual button.

16. A contact lens as claimed in claim 1, wherein a three layer sandwich button is formed wherein a dark coloured central layer is sandwiched between two clear layers.

17. A contact lens as claimed in claim 16, wherein the central layer has a thickness of 0.05 mm to 1 mm.

18. A contact lens as claimed in claim 1, wherein a three layer sandwich button is formed with a dark coloured central layer sandwiched between two clear layers.

19. A contact lens as claimed in claim 1, wherein the band of dark substantially light-absorbing colour is provided at a radius of between 5.0 mm and 6.75 mm from the central axis of the contact lens.

20. A contact lens as claimed in claim 1, wherein the band of dark substantially light-absorbing colour is provided with a width of 0.2 mm to 1.0 mm.

* * * * *